United States Patent [19]

Mark

[11] 4,066,618
[45] Jan. 3, 1978

[54] FLAME RETARDANT POLYCARBONATE COMPOSITION

[75] Inventor: Victor Mark, Evansville, Ind.

[73] Assignee: General Electric Company, Pittsfield, Mass.

[21] Appl. No.: 429,644

[22] Filed: Dec. 28, 1973

[51] Int. Cl.$^2$ ................................................ C08K 5/09
[52] U.S. Cl. ........................ 260/45.85 T; 260/45.85 V; 260/45.85 R; 260/45.85 E
[58] Field of Search ............... 260/45.85 E, 45.85 T, 260/45.85 R, 45.85 V, 468 G, 485 F, 485 H, 486 H, 514 G, 514 J, 539 R, 539 A

[56] References Cited

U.S. PATENT DOCUMENTS

| 2,758,918 | 8/1956 | Soloway et al. | 260/468 |
| 2,839,553 | 6/1958 | Soloway | 260/45.85 |
| 3,288,813 | 11/1966 | Kleiman | 260/45.85 |
| 3,365,470 | 1/1968 | Schmerling | 260/45.85 |
| 3,522,204 | 7/1970 | Savides | 260/45.85 |
| 3,535,300 | 10/1970 | Gable | 260/45.85 |

Primary Examiner—V. P. Hoke
Attorney, Agent, or Firm—William F. Mufatti

[57] ABSTRACT

A flame retardant polycarbonate composition comprising in admixture an aromatic carbonate polymer and a flame retardant additive which may be the metal salts of a halogenated non-aromatic carboxylic acid.

7 Claims, No Drawings

FLAME RETARDANT POLYCARBONATE COMPOSITION

This invention is directed to a flame retardant polycarbonate composition and in particular an aromatic polycarbonate containing in admixture therewith a particular flame retardant additive which may be the metal salts of a halogenated non-aromatic carboxylic acid.

BACKGROUND OF THE INVENTION

With the increasing concern for safety, there is a positive move towards providing safe materials for public and household use. One particular area of need is that of providing flame resistant or flame retardant products for use by the ultimate consumer. As a result of this demand, many products are being required to meet certain flame retardant criteria both by local and federal government and the manufacturers of such products. One particular set of conditions employed as a measuring standard for flame retardancy is set forth in Underwriters Laboratories, Inc. Bulletin 94. This Bulletin sets forth certain conditions by which materials are rated for self-extinguishing characteristics.

In the art, there are many known flame retardant additives which are employed by mixing the products to render such materials self-extinguishing or flame retardant. Such flame retardant additives have been known to be employed in amounts of 5 to 20 weight percent in order to be effective in extinguishing burning of those products which are combustible. It has also been found that such amounts can have a degrading effect upon the base product to be rendered flame retardant, resulting in the losses of valuable physical properties of the base product. This is particularly so when employing known flame retardant additives with the base product polycarbonate resins. Many of these known additives have a degrading effect upon the polymer.

DESCRIPTION OF THE INVENTION

It has now been surprisingly discovered that an aromatic polycarbonate can be made flame retardant by incorporating with the aromatic polycarbonate minor amounts of certain additives, which additives are inert and do not degrade the aromatic polycarbonate. The particular additive employed herein is unique in that even very minor amounts render the aromatic polycarbonate flame retardant. The amount of the additive employed herein can vary, preferably, from 0.01 to about 10 weight percent based on the weight of the aromatic polycarbonate.

More specifically, the particular additive of this invention is the metal salt of a halogenated non-aromatic carboxylic acid, and includes mixture of metal salts of halogenated non-aromatic carboxylic acids. The metal salt employed in the practice of this invention is either the alkali metal or alkali earth metal salt, or mixtures of metal salts. The metals of these groups are sodium, lithium, potassium, rubidium, cesium, berrylium, magnesium, calcium, strontium and barium. The halogen function may be either bromine, chlorine or fluorine. However, when fluorine is used as the only halogen substituent, the carboxylic acid must be a dicarboxylic acid. The halogen function may be also a mixture of halogens. Preferably, the carboxylic acid function contains one to two carboxylic functions and from 1 to about 20 carbon atoms. In the practice of this invention, the preferred metal salts of a halogenated non-aromatic carboxylic acid are disodium hexafluoroglutarate,

and disodium 1,4,5,6,7,7-hexachlorobicyclo[2.2.1]-5-norbornene-1,2-dicarboxylate, also known as sodium chlorendate,

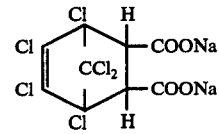

PREFERRED EMBODIMENT OF THE INVENTION

In order to more fully and clearly illustrate the present invention, the following specific examples are presented. It is intended that the examples be considered as illustrative rather than limiting the invention disclosed and claimed herein. In the examples, all parts and percentages are on a weight basis unless otherwise specified.

EXAMPLE I

Ninety-nine parts of an aromatic polycarbonate, prepared by reacting 2,2-bis(4-hydroxyphenyl)propane and phosgene in the presence of an acid acceptor and a molecular weight regulator and having an intrinsic viscosity of 0.57 is mixed with 1 part of a finely ground dehydrated additive listed in Table I by tumbling the ingredients together in a laboratory tumbler. The resulting mixture is then fed to an extruder, which extruder is operated at about 265° C., and the extrudate is comminuted into pellets.

The pellets are then injection molded at about 315° C. into test bars of about 5 in. by ½ in. by about 1/16–⅛ in. thick. The test bars (5 for each additive listed in the Table) are subject to the test procedure set forth in Underwriters Laboratories, Inc. Bulletin UL-94, Burning Test for Classifying Materials. In accordance with this test procedure, materials so investigated are rated either SE-O, SE-I or SE-II based on the results of 5 specimens. The criteria for each SE rating per UL-94 is briefly as follows:

"SE-O": Average flaming and/or glowing after removal of the igniting flame shall not exceed 5 seconds and none of the specimens shall drip flaming particles which ignite absorbent cotton.

"SE-I": Average flaming and/or glowing after removal of the igniting flame shall not exceed 25 seconds and the glowing does not travel vertically for more than ⅛ inch of the specimen after flaming ceases and glowing is incapable of igniting absorbent cotton.

"SE-II": Average flaming and/or glowing after removal of the igniting flame shall not exceed 25 seconds and the specimens drip flaming particles which ignite absorbent cotton.

In addition, a test bar which continues to burn for more than 25 seconds after removal of the igniting flame is classified, not by UL-94, but by the standards of the instant invention, as "burns". Further, UL-94 requires that all test bars in each test group must meet the SE type rating to achieve the particular classification. Otherwise, the 5 bars receive the rating of the worst single bar. For example, if one bar is classified as SE-II and the other four are classified as SE-O, then the rating for all 5 bars is SE-II.

The results of the different additives within the scope of the instant invention are as follows with a control being the aromatic polycarbonate as prepared above without the additive of the type set forth herein.

Table 1

| Additive (1.0 weight percent) | Flame Out Time Seconds (Avg.) | No. of Drips Per Test Bar | Rating | Remarks |
|---|---|---|---|---|
| CONTROL | 31.6 | 4+ | Burns | |
| Disodium chlorendate (trivial name of compound in claim 5) | 2.6 | 0.8 | SE-II | 1 test bar was SE-O |
| Dilithium chlorendate | 5.2 | 0.8 | SE-II | 2 test bars were SE-O |
| Dipotassium chlorendate | 2.6 | 1.0 | SE-II | |
| Strontium chlorendate | 8.6 | 0.8 | SE-II | 2 test bars were SE-I |
| Sodium trichloroacetate | 2.6 | 0.8 | SE-II | 1 test bar was SE-O |
| Sodium 3,4-dichlorocinnamate | 3.6 | 3.0 | SE-II | |
| Disodium hexafluoroglutarate | 4.1 | 1.2 | SE-II | 1 test bar was SE-O |
| Disodium dibromomaleate | 2.5 | 1.4 | SE-II | |

EXAMPLE II

This Example is set forth to demonstrate the effect of the flame retardant additives of this invention at the lower limits of 0.01 weight percent based on the weight of the polymer composition.

In preparing the test bars for this Example, 99.99 parts of the polycarbonate of Example I is mixed with 0.001 weight percent of the additives listed in Table 2 employing the same procedure. Test bars are then molded using the same procedure employed in Example I. The test bars are subjected to the same test procedure of Example I with the following results:

TABLE 2

| Additive (0.01 weight percent) | Flame Out Time Seconds (Avg.) | No. of Drips Per Test Bar | Rating | Remarks |
|---|---|---|---|---|
| Disodium chlorendate | 9.5 | 4.0 | SE-II | |
| Sodium trichloroacetate | 11.1 | 3.6 | SE-II | |

EXAMPLE III

This Example is set forth to show the effect of a known commercially available flame retardant additive.

A.

Example I is repeated except that in place of the additives employed therein, only 1 part 1,2,5,6,9,10-hexabromocyclododecane is used herein. The results obtained upon evaluating five test bars are the same as obtained for the Control shown in Table 1. above.

B.

Part A. above is repeated but using 5 weight percent of the above additive, namely 1,2,5,6,9,10-hexabromocyclododecane. The results obtained are the same as obtained in Part A. above.

C.

Part A. above is repeated but using 10 weight percent of the above additive, namely 1,2,5,6,9,10-hexabromocyclododecane. At this level of additive, test bars are rated SE-II. However, the polycarbonate is badly degraded as evidenced by severe dark streaking of the molded test bars, which degradation does not occur with the additives of the instant invention.

EXAMPLE IV

Example III is repeated except that hexabromobiphenyl is employed herein. The results obtained are essentially the same as those of Example III.

EXAMPLE V

Example III is repeated except that the additive employed herein is a combination of antimony oxide and a material which is a mixture of polychlorinated biphenyl (Aroclor by Monsanto Company). The proportion of the ingredients of the additive employed in this example is based on 3 parts of chlorine per 1 part of antimony. The results obtained at 1 weight percent and 5 weight percent amounts are the same as in Example III.

However, at the higher amount, namely 10 weight percent, flame retardancy effect is noted with, but again, severe degradation of the polycarbonate, as evidenced by the substantial reduction in the instrinsic viscosity of the molded test bars. As molded, the intrinsic viscosity of the test bars with 1 weight percent of the above additive is about 0.50. This shows the severe degradation of the polycarbonate when employing this type of well known flame retardant.

In the practice of this invention, aromatic carbonate polymers are rendered flame retardant by the addition of certain particular additives which are the metal salts of halogenated non-aromatic carboxylic acids. The amount of the additives employed in the practice of this invention may vary from 0.01 to up to that amount which, after further increasing of such amount, does not materially increase the flame retardant properties of the carbonate polymer. This is generally up to about 10 weight percent based on the weight of the aromatic carbonate polymer but may be higher. The amount of the additives to be employed can also be a function of the degree of flame retardancy desired.

It is not exactly understood how the additive of this invention functions or how such minor amounts can act as an effective flame retardant for the aromatic carbonate polymer. Analysis of the composition of this invention after being subjected to a fire temperature of about 600° C. showed an unusually high percentage of remaining char. This leads one to hypothesize that the additive may act as a cross-linking agent when the aromatic carbonate polymer is subjected to fire temperatures. However, it is emphasized that this is only theory and should not be construed as actually occurring.

As indicated previously, the additive of the instant invention comprises the alkali or alkali earth metal salts of halogenated non-aromatic carboxylic acids or mixtures of these. While a great number of such salts are set forth in the tables of the Examples of the instant invention, these are only a representative sample of the additives of this invention. The sodium, calcium, magnesium, potassium, strontium, lithium, barium, rubidium, and cesium salts of other halogenated non-aromatic carboxylic acids can be employed in place of those of the Examples with the same effective flame retardancy being achieved. These other metal salts of halogenated non-aromatic carboxylic acids are:

Disodium
5,6,7,8,9,9-hexachloro-1,2,3,4,4a,5,8,8a-octahydro-5,8-endo-methylene-2,3-dicarboxylate

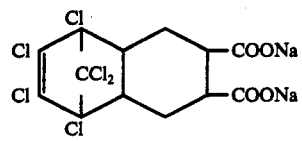

Disodium
5,6,7,8,9,9-hexachloro-1,2,3,4,4a,5,8,8a-octahydro-1,4-5,8-di-endo-methylene-2,3-dicarboxylate

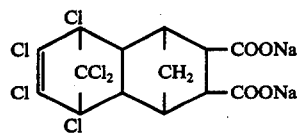

Calcium 2,3,4,5,6-pentachlorocinnamate

Potassium dichlorofluoroacetate

Barium 2,3,4,5,6,-pentachloro-α,α-difluorophenylacetate

Calcium 1,4,5,6,7,7-hexachloronorbornene-2-carboxylate

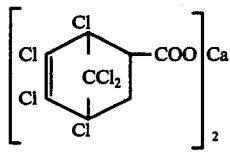

In the practice of this invention, the additive is generally prepared by well known methods in the art. Thus, the commercially available acids or anhydrides are contacted in aqueous or alcoholic solution and suspension with the alkali and alkali earth metal hydroxide, oxide or carbonate until neutralization is achieved. The salt is isolated by filtration or concentration or stripping of the solution and is rendered anhydrous by drying.

In the practice of this invention, any of the aromatic polycarbonates can be employed herein. However, particularly useful are the aromatic polycarbonates prepared by reacting a dihydric phenol, such as bisphenol-A (2,2'bis(4 hydroxyphenyl)propane) with a carbonate precursor. Typical of some of the dihydric phenols that may be employed in the practice of this invention are bis(4-hydroxyphenyl)methane, 2,2-bis(4-hydroxyphenyl)propane, 2,2-bis(4-hydroxy-3-methylphenyl)propane, 4,4-bis(4-hydroxyphenyl)heptane, 2,2-(3,5,3',5'-tetrachloro-4,4'-dihydroxydiphenyl)propane, 2,2-(3,5,3',5'-tetrabromo-4,4'-dihydroxydiphenyl)propane, (3,3'dichloro-4,4'-dihydroxydiphenyl)methane.Other dihydric phenols of the bisphenol type are also available and are disclosed in U.S. Pat. Nos. 2,999,835, 3,028,365 and 3,334,154.

In addition, the reaction is carried out with the carbonate precursor in the presence of a molecular weight regulator, an acid acceptor and a catalyst. The preferred carbonate precursor generally employed in preparing carbonate polymers is carbonyl chloride. However, other carbonate polymers is carbonyl chloride. However, other carbonate precursors may be employed and this includes other carbonyl halides, carbonate esters or haloformates.

The acid acceptors, molecular weight regulators and catalysts employed in the process of preparing polycarbonates are well known in the art and may be any of those commonly used to prepare polycarbonates.

It will thus be seen that the objects set forth above among those made apparent from the preceding description are efficiently attained and since certain changes may be made in carrying out the above process and in the composition set forth without departing from the scope of this invention, it is intended that all matters contained in the above description shall be interpreted as illustrative and not in a limiting sense.

What is claimed is:

1. A flame retardant aromatic carbonate polymer composition comprising in admixture an aromatic carbonate polymer and a flame retardant amount of an additive which is the metal salt of a halogenated non-aromatic carboxylic acid, wherein the metal salt is selected from the group consisting of alkali metals and alkali earth metals, and mixtures thereof, and the halogen is selected from the group consisting of bromine and chlorine and mixtures thereof, and fluorine, provided, however, that when fluorine is used, the carboxylic acid is a dicarboxylic acid.

2. The composition of claim 1 wherein the composition comprises 0.01 to about 10.0 weight percent of the additive based on the weight of the aromatic carbonate polymer.

3. The composition of claim 1 wherein the additive is selected from the group of carboxylic acids containing one to two carboxylic functions and from 1 to 20 carbon atoms.

4. The composition of claim 1 wherein the additive is disodium hexafluoroglutarate.

5. The composition of claim 1 wherein the additive is sodium trichloroacetate.

6. The composition of claim 1 wherein the additive is disodium dibromomaleate.

7. The composition of claim 1 wherein the additive is disodium 1,4,5,6,7,7-hexachlorobicyclo[2.2.1]-5-norbornene-1,2-dicarboxylate.

* * * * *

UNITED STATES PATENT AND TRADEMARK OFFICE
CERTIFICATE OF CORRECTION

PATENT NO. : 4,066,618
DATED : January 3, 1978
INVENTOR(S) : Victor Mark

It is certified that error appears in the above-identified patent and that said Letters Patent are hereby corrected as shown below:

Col. 1, line 26, delete "the" and insert -- with -- in its place.

, line 55, "mixture" should be -- mixtures --

Col. 3, line 27, "0.001" should be -- 0.01 --

Col. 4, line 43, "Additives" should be -- additive --

Col. 6, lines 10 and 11, delete "However, other carbonate polymers is carbonyl chloride."

Signed and Sealed this

Eighteenth Day of April 1978

[SEAL]

Attest:

RUTH C. MASON
*Attesting Officer*

LUTRELLE F. PARKER
*Acting Commissioner of Patents and Trademarks*